Figure 1:
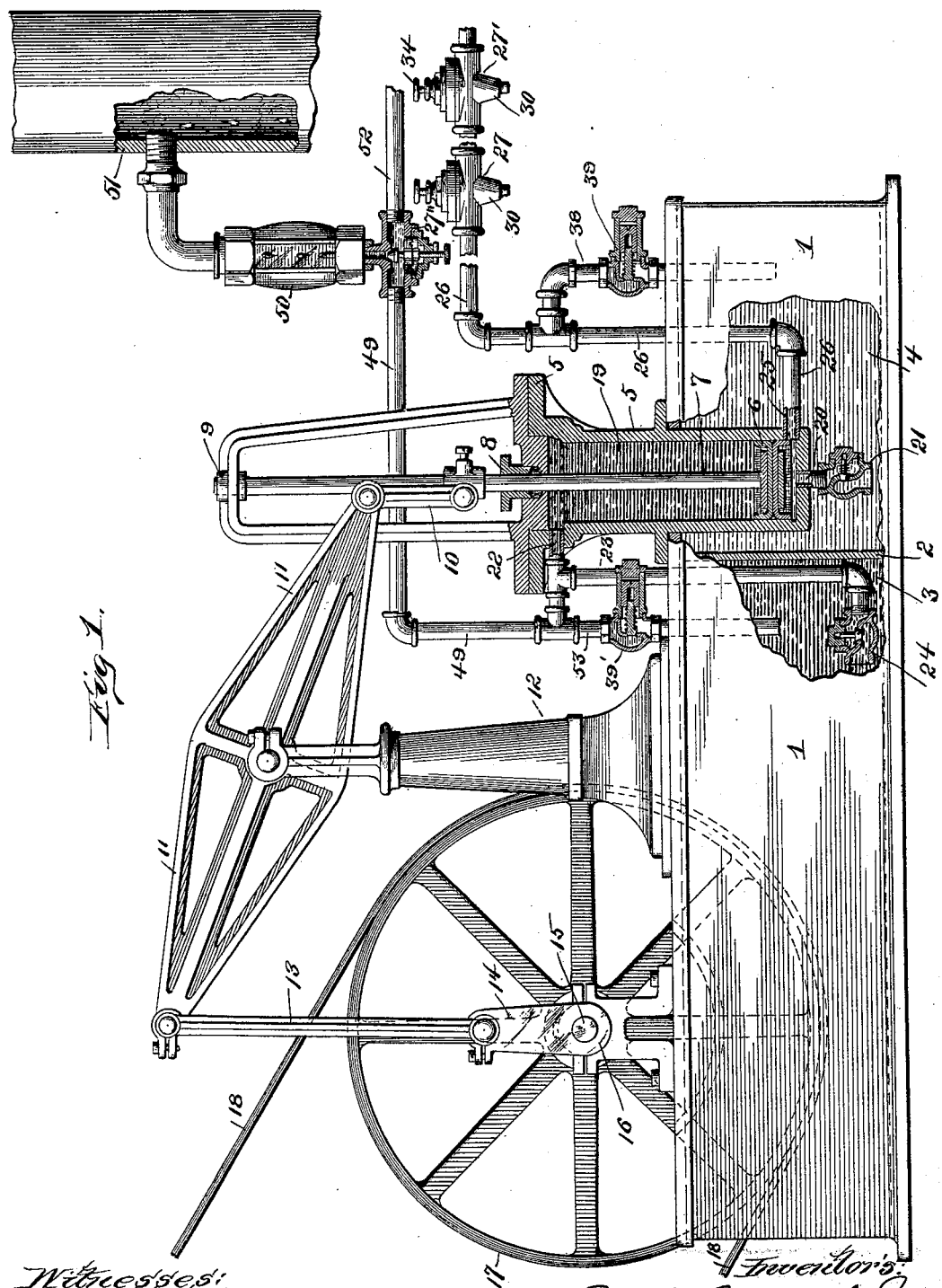

No. 614,902. Patented Nov. 29, 1898.
J. H. SIEGRIST, Jr.
LUBRICATOR.
(Application filed Feb. 5, 1894.)

(No Model.) 2 Sheets—Sheet 1.

Witnesses:
Inventor:
J. H. Siegrist Jr.
by Fowler & Fowler Attys

No. 614,902. Patented Nov. 29, 1898.
J. H. SIEGRIST, Jr.
LUBRICATOR.
(Application filed Feb. 5, 1894.)
(No Model.) 2 Sheets—Sheet 2.
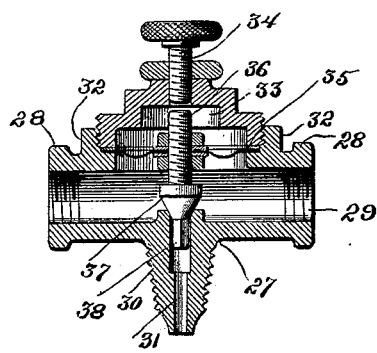
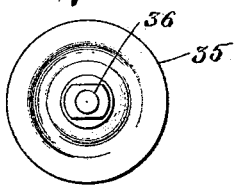
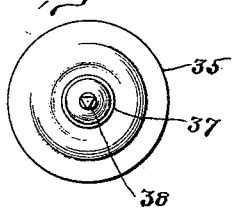
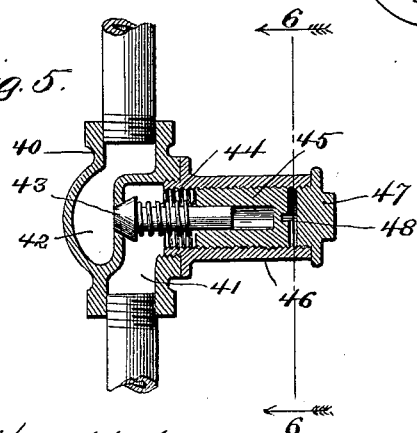
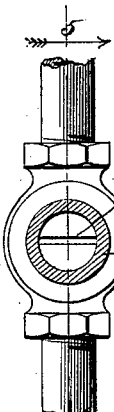
Witnesses:
Inventor:
J. H. Siegrist Jr.
By Fowler & Fowler
Attys

UNITED STATES PATENT OFFICE.

JOHN H. SIEGRIST, JR., OF ST. LOUIS, MISSOURI.

LUBRICATOR.

SPECIFICATION forming part of Letters Patent No. 614,902, dated November 29, 1898.

Application filed February 5, 1894. Serial No. 499,076. (No model.)

*To all whom it may concern:*

Be it known that I, JOHN H. SIEGRIST, Jr., a citizen of the United States, residing at St. Louis, in the State of Missouri, have invented a certain new and useful Improvement in Lubricators, of which the following is such a full, clear, and exact description as will enable any one skilled in the art to which it appertains to make and use the same, reference being had to the accompanying drawings, forming part of this specification.

The main object of my invention is to provide a compact and simple automatic device for lubricating the bearings or other working parts of a steam-engine or other machinery, such device being adapted to supply, if desirable, one kind of lubricant to one bearing or set of bearings and another kind of lubricant to another or others to facilitate the lubrication of parts difficult of access and to effect the lubrication as a whole in a uniform, efficient, and economical manner. To accomplish this, I provide a general supply reservoir or tank, pipes for conveying the oil from the tank or reservoir to the bearing or other working parts, means for subjecting the oil in the pipes to pressure, a specially-constructed automatic feed-valve for regulating the quantity of oil delivered to a bearing or other working part, and I may also provide another specially-constructed automatic relief-valve for returning the excess of oil to the general supply-reservoir. One form of my device is also adapted to supply from a single pressure-chamber one kind of oil to one bearing or set of bearings and a second kind of oil to another or other sets of bearings.

My invention will be best understood by reference to the accompanying drawings, in which—

Figure 1 represents a side elevation, partly in section, of my device with pipes leading to feed-valves. Fig. 2 is a sectional view of my automatic feed-valve; Fig. 3, an end view of the diaphragm and lower stem of the plug employed in said feed-valve. Fig. 4 is a view of the opposite end of said diaphragm and plug. Fig. 5 is a sectional elevation of the relief-valve, taken along line 5 5 of Fig. 6, looking in the direction of the arrows shown in said last-mentioned figure. Fig. 6 is a sectional elevation of said relief-valve, taken along line 6 6 of Fig. 5, looking in the direction of the arrows shown in said last-mentioned figure.

Referring to the drawings, in which the same marks of reference indicate the same parts throughout the several views, 1 represents a bed or base, of metal or other material, upon which my device is mounted. This bed or base is hollow and is preferably divided by a transverse partition 2, so as to form two separate compartments 3 and 4. These compartments constitute the reservoirs for containing the oil or other lubricant. In the drawings the compartment 3 is shown as containing a heavier cylinder-oil (indicated by heavy shading) and the compartment 4 as containing the lighter journal-oil, (indicated by light shading.) It is obvious, however, that in practice the bed or base may be made with but one compartment therein, or, if made in separate compartments, said compartments may all contain the same kind of oil or lubricant.

Rigidly mounted upon the bed or base 1 is a cylinder 5, said cylinder having within it a chamber 19. Adapted to reciprocate within said chamber is a piston 6, which is attached to the lower end of a piston-rod 7, which said piston-rod extends through the stuffing-box 8 at the top of the cylinder and is adapted to move in the guide 9, said guide being mounted upon the upper end of the cylinder 5. To the upper part of the piston-rod 7 is attached by any suitable connection (preferably, as shown in the drawings, by the pivoted link 10) a walking-beam 11, which walking-beam is suitably pivoted at its center to the upper end of the upright support or standard 12, mounted upon the bed or base 1. The opposite end of the walking-beam 11 is connected by a pivoted link 13 with a crank-arm 14, which is rigidly attached to a shaft 15, which shaft is adapted to rotate in suitable bearings 16, mounted upon the bed or base 1. Rigidly affixed upon the shaft 15 is a driving-wheel 17. This driving-wheel may be rotated by any suitable mechanism to which it may be geared or belted; but I preferably connect it by a belt 18 with the engine or other machinery which it is designed to lubricate, thereby securing a rate of movement in the lubricating device commensurate with the rapidity of movement of the machinery to be lubricated. The lower end of the chamber 19 of the cylinder 5 communicates with the reservoir 4 by means of the inlet-pipe 20, to the lower end of which is attached the check-valve 21. The upper end of said chamber 19 communicates with the reservoir 3 by means of the orifice 22, into the outer opening of which is secured the pipe 23, which said pipe extends down into said reservoir 3 and has upon its lower extremity a check-valve 24 similar to the check-valve 21. These check-valves are of ordinary construction and are normally closed by the pressure of oil upon their valve-plugs; but when a partial or total vacuum is created within that part of the cylinder-chamber communicating with said valve so that the pressure on the oil in the reservoir exceeds the pressure in the pipes leading from said valves then the atmospheric pressure upon the oil in the reservoir will open the valves and the oil will pass into that end of the cylinder-chamber to which the pipe communicates. Near the bottom of the lower part of the cylinder-chamber 19 is an outlet-aperture 25, which aperture is properly threaded at its outer end to receive the outlet or supply pipe 26, by which the oil from the lower part of the cylinder-chamber is fed to the bearings to be lubricated. This outlet-pipe may, by proper elbows and joints, be made to conduct in any desired direction and to any number of bearings or other working parts. In the drawings the supply-pipe 26 is shown as leading to the automatic feed-valves 27 and 27'. These valves are attached directly to the bearings to be lubricated. The bearings are not shown in the drawings.

The construction and mode of operation of the automatic feed-valves may be best understood by referring to Fig. 2, which is a sectional view of one of said valves. It consists of the cylindrical casing 28, which has therein the longitudinal orifice 29. On the lower side of said casing and preferably made integral therewith is a conical projection 30, said projection being threaded upon its lower end, so as to be screwed into the bearing to which the valve is attached. The conical projection 30 has an opening 31 therethrough, leading from the orifice 29 to the lower end of said projection, the said opening being enlarged at its upper extremity to form the valve-seat. The valve-casing 28 has an upper-extending portion 32, into which is fitted a cap-piece 33. Between the upper-extending portion and the cap-piece is inserted a circular metallic spring-diaphragm 33, Figs. 2, 3, and 4, which is held in place by the cap-piece 35. The said spring-diaphragm is rigidly affixed upon the upper end of the valve-stem 36, which valve-stem extends across the orifice 29 and has near its lower extremity the conical plug 37, adapted to normally rest in the valve-seat and close the orifice 31. In the cap-piece 33 is a thumb-screw 34, adapted to regulate the longitudinal movement of the valve-stem, and thus govern the extent to which the valve will open. It will be seen that this valve is normally closed by the pressure of the spring-diaphragm 35, which holds the conical plug 37 down upon the valve-seat. When, however, pressure is exerted upon the oil, the diaphragm, being elastic, yields to such pressure, thereby lifting the plug from its contact with the valve-seat and opening the valve. The extent to which the valve will open may be regulated at pleasure by means of the thumb-screw 34, and the amount of oil delivered to the bearings will depend upon the pressure applied to the oil.

Connected with the pipe 26, which conveys the oil to the bearings, I may provide a return-pipe 38, leading from the pipe 26 back to the reservoir through the automatic relief-valve 39. The relief-valve is so constructed as to be normally closed, but is adapted to be opened by a considerable increase of pressure in the pipe leading thereto, and when such pressure is exerted within the pipe the valve is opened and permits the oil to pass through and return to the general reservoir, thereby relieving the pressure in the supply-pipe and returning the excess of oil to the reservoir or tank. A sectional view of the automatic relief-valve employed in my device is shown in Fig. 5. It consists of the valve-casing 40, having therein two chambers 41 and 42, which said chambers have an opening between them normally closed by the valve-plug 43, which is held to its seat by a helical spring 44, which spring rests against a collar 45. The collar 45 is screwed into a hollow projecting piece 46, properly threaded to receive it. The projecting piece 46 is threaded and adapted to have a cap-piece 47 screwed upon its outer end. This cap-piece may be unscrewed and removed, and the collar 45 may then be moved in or out at pleasure by inserting a screw-driver in the groove 48, Figs. 5 and 6. In this way the pressure exerted by the spring upon the valve-plug 43 may be increased or diminished at will. As I have described in detail the supply-pipe leading from the lower end of the cylinder-chamber 19, together with the feed-valves designed to deliver oil to the several bearings connected therewith and also the relief-valve for returning the excess of oil to the reservoir, it is now sufficient to say that the supply-pipe leading from the upper end of said cylinder-chamber 19 is of similar construction, with such modification as to its elbows, joints, &c., as the direction given the pipe and the exigencies of the situation may require. In the drawings I have shown that supply-pipe attached to the aperture 22 in the upper part of the cylinder-chamber 19 and adapted to convey the cylinder-oil contained in the reservoir 3 of the bed through the pipe 49 to the feed-valve 27'', from which it is supplied through the ordinary sight-feed 50 to the steam-pipe 51, which steam-pipe is supposed to communicate with the cylinder of an engine. (Not shown in the drawings.) I show also in the drawings a piece of pipe 52 beyond the feed-valve 27''', through which the oil may be conveyed to other points which it is designed to lubricate.

The automatic relief-valve 39' is connected with the supply-pipe 49 by the pipe 53, and through that pipe and that valve the excess of oil is returned to the reservoir 3 in the same manner as hereinbefore described in connection with the description of the mode of operation of the supply-pipe 26.

The operation of my lubricating device is as follows: A rotary motion is communicated to the driving-wheel 17 by means of the belt 18, which preferably passes around a pulley rotated by the machinery to be lubricated. The motion of the driving-wheel is communicated to the walking-beam through the intermediate mechanism of the crank 14 and link 13, which causes the walking-beam to oscillate, and its motion is in turn communicated to the piston-rod 7 by means of the link 10. This causes the piston 6 to move up and down in the cylinder-chamber 19. As the piston moves upward in said chamber a vacuum or partial vacuum is created in the lower part thereof, and the atmospheric pressure upon the oil in the reservoir 4 opens the check-valve 21 and permits the oil to enter the lower end of the cylinder-chamber. When the piston has reached the extreme point in its upward movement and begins to descend, the valve 21 closes, and as the piston continues its descent the oil is forced out through the supply-pipe 26. The pressure of the oil in said supply-pipe causes the elastic metallic diaphragm 35 of the feed-valves 27 and 27' to bend upward, thereby lifting the valve-plug 37 from the valve-seat, in which it normally rests, and permits the escape of oil through the orifice 31, Fig. 2, which oil is deposited upon the bearings to which said feed-valves are attached. The feed-valves 27 and 27' being adjusted by means of the thumb-screw 34 to deliver only the required quantity of oil, if more oil is forced into the supply-pipe 26 than is discharged upon the bearings then the continued pressure exerted upon said oil by the downward movement of the piston will cause the relief-valve 39 to open and allow the excess of oil to return to the reservoir 4. As the piston 6 descends a vacuum or partial vacuum is created above said piston in the upper part of the cylinder-chamber 19, and the check-valve 24 opens and permits the oil in the reservoir 3 to pass through the pipe 23 and orifice 22 into the upper part of said cylinder-chamber. When the piston 6 has reached the extreme point of its descent and begins to ascend, the check-valve 24 will be closed by the pressure of the oil in the pipe 23, communicating therewith, and as the said piston continues to ascend the oil in the upper part of the cylinder-chamber will be forced out through the orifice 22 and supply-pipe 49 to the feed-valve 27'' and through any other feed-valve which may be connected with the supply-pipe 52. These feed-valves will be opened and will permit oil to be deposited upon bearings in the same way as heretofore described in connection with the description of the feed-valves 27 and 27'. The excess of oil is likewise returned to the reservoir 3 through the pipe 53 and the automatic relief-valve 39', as heretofore described. It is thus seen that there is no idle motion in the movement of the piston 6. As it descends it is delivering one kind of oil to one or more bearings or working parts, and as it ascends it is delivering another or, if preferred, the same kind of oil to another bearing or other bearings, and in each case the excess of lubricant is automatically returned to the source of supply.

Although I preferably actuate the piston which exerts the pressure necessary to supply the oil to bearings by means of the driving-wheel, walking-beam, and intermediate devices herein described, I do not wish to limit myself to those devices, as, for instance, I may connect the piston-rod 7 directly with some moving part of the machinery to be lubricated, or I may employ various other expedients which will suggest themselves to skilled mechanics.

I am aware of a patent to Fitzgerald, No. 458,450, in which is described a lubricator adapted to convey oil from a reservoir or source of supply by means of a pipe connected to oil-cups, which are normally closed and are opened by the pressure applied to the oil, to permit the deposit of oil upon the bearings to be lubricated. I am not aware, however, that a lubricator has been heretofore devised or used which conveys oil to one or more bearings through feed-valves connected with such bearings and having an automatic relief-valve for returning the excess of oil to the source of supply, and thereby regulating the operation of the feed-valve; nor has oil been so supplied by means of the pressure of a piston exerted thereon, said piston moving in a cylinder-chamber and supplying one kind of oil to one set of bearings during its downward stroke and the same or a different kind of oil to another set of bearings during its upward or return stroke. I am aware also that two kinds of oil have been supplied to bearings from two cylinders, one of said cylinders being placed immediately underneath the other and pressure being exerted upon the oil in both cylinders through the movement of a single piston-rod attached to pistons in each. In this device all the work is done while the piston-rod and pistons are moving in one direction, and no oil whatever is delivered while they are moving in the opposite direction. This arrangement presents two marked disadvantages—viz., it utilizes only one part of the stroke of the pistons, and it requires the application of great motive force to operate the piston-rod against the pressure in both cylinders.

It will be seen that my device is readily differentiated from the devices heretofore known and used and above described in that I employ but one cylinder and piston for delivering, if desired, two kinds of oil and in that I utilize both the downward and upward or return stroke in delivering oil to bearings. I am likewise aware that a lubricator has been known and used having a return-pipe and valve adapted to return the excess of oil to the supply-reservoir, said valve to be opened and closed by manual intervention; but I am not aware that a lubricator has ever been known or used having an automatic relief-valve for returning such oil as may not be deposited upon the bearings to the source of supply.

Having fully described my invention, what I desire to claim and secure by Letters Patent of the United States is—

1. In a lubricating apparatus, the combination of an oil-reservoir, a cylinder communicating with said reservoir, a piston adapted to reciprocate in said cylinder, means for actuating said piston, one or more automatic feed-valves communicating with bearings, a supply-pipe leading from such valves to said cylinder, such valves adapted to be opened by the intermittent pressure in the supply-pipe, and an automatic relief-valve communicating with said supply-pipe and with the reservoir, said relief-valve being actuated by the pressure in the supply-pipe.

2. In a lubricator, the combination of two reservoirs, a pressure-chamber communicating at or near one end with one reservoir, and at or near the other with the second reservoir, means for alternately subjecting the oil in each end of said pressure-chamber to pressure, a pipe leading from one end of said pressure-chamber and communicating with one set of bearings, and a second pipe leading from the other end of said pressure-chamber to a second set of bearings.

3. In a lubricator, the combination of automatic feed-valves attached to bearings, a supply-pipe leading thereto, said valves being actuated by the pressure in said supply-pipe, a return-pipe communicating with said supply-pipe, and an automatic relief-valve communicating with said return-pipe, said relief-valve being actuated by the pressure in said return-pipe and communicating with the oil-reservoir or source of supply.

In testimony whereof I have hereunto set my hand and affixed my seal, this 1st day of February, 1893, in the presence of the two subscribing witnesses.

JOHN H. SIEGRIST, JR. [L. S.]

Witnesses:
A. C. FOWLER,
ART. D. GREENE.